(12) United States Patent
El-Yamany

(10) Patent No.: US 11,032,528 B2
(45) Date of Patent: Jun. 8, 2021

(54) GAMUT MAPPING ARCHITECTURE AND PROCESSING FOR COLOR REPRODUCTION IN IMAGES IN DIGITAL CAMERA ENVIRONMENTS

(71) Applicant: Intel Corporation, Santa Clara, CA (US)

(72) Inventor: Noha El-Yamany, Kangasala (FI)

(73) Assignee: INTEL CORPORATION, Santa Clara, CA (US)

(*) Notice: Subject to any disclaimer, the term of this patent is extended or adjusted under 35 U.S.C. 154(b) by 64 days.

(21) Appl. No.: 16/124,360

(22) Filed: Sep. 7, 2018

(65) Prior Publication Data

US 2019/0045160 A1    Feb. 7, 2019

(51) Int. Cl.
| | |
|---|---|
| *H04N 9/64* | (2006.01) |
| *G06T 7/90* | (2017.01) |
| *H04N 1/60* | (2006.01) |
| *H04N 9/67* | (2006.01) |
| *G06T 5/00* | (2006.01) |

(52) U.S. Cl.
CPC .............. *H04N 9/646* (2013.01); *G06T 5/009* (2013.01); *G06T 7/90* (2017.01); *H04N 1/6061* (2013.01); *H04N 9/643* (2013.01); *H04N 9/67* (2013.01); *G06T 2207/10024* (2013.01)

(58) Field of Classification Search
CPC .......... H04N 9/646; H04N 9/643; H04N 9/67; H04N 1/6061; G06T 7/90; G06T 5/009; G06T 2207/10024

See application file for complete search history.

(56) References Cited

U.S. PATENT DOCUMENTS

| | | | | |
|---|---|---|---|---|
| 2007/0085855 A1* | 4/2007 | Tin | ........................... | G09G 5/02 345/590 |
| 2019/0158894 A1* | 5/2019 | Lee | ...................... | H04N 21/236 |
| 2019/0325802 A1* | 10/2019 | Aly | ........................ | G09G 5/026 |

* cited by examiner

*Primary Examiner* — Zhitong Chen
(74) *Attorney, Agent, or Firm* — Jaffery Watson Mendonsa & Hamilton LLP

(57) ABSTRACT

A mechanism is described for facilitating gamut mapping architecture and processing for color reproduction in image processing environments, according to one embodiment. A method of embodiments, as described herein, includes one or more processors to: compute one or more of gamut boundary descriptors and mapping configurations associated with a colored image captured using one or more cameras; and perform gamut mapping of color representation of the image based on the one or more of the gamut boundary descriptors and the mapping configurations, wherein the gamut mapping to facilitate color reproduction of the image.

17 Claims, 12 Drawing Sheets

GAMUT MAPPING ARCHITECTURE AND PROCESSING FOR COLOR REPRODUCTION IN IMAGES IN DIGITAL CAMERA ENVIRONMENTS

FIELD

Embodiments described herein relate generally to data processing and more particularly to facilitate gamut mapping architecture and processing for color reproduction in images in digital camera environments.

BACKGROUND

In a typical image signal processor (ISP) of a color digital camera system, there are two blocks or operations that are responsible for color reproduction accuracy: white balancing (WB) and color conversion (CC), where the latter is also known as color correction.

Conventional ISPs are limited in their use within color digital camera systems in that they do not employ any form of color gamut mapping solutions. This often leads to having image colors falling outside the target color gamut, where hard clipping of out-of-gamut (OOG) colors could cause detail losses and/or unnatural or unpleasant color reproduction in images.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for gamut mapping (GM)-based color production in digital camera systems. In one embodiment, this GM-based mapping and processing is used to offer a GM solution after color correction and/or enhancement to ensure that out-of-gamut (OOG) colors remain inside the target gamut and thus add invaluable accuracy and high image quality (IQ) to color production and detail preservation in digital colored images.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

Figure 1:
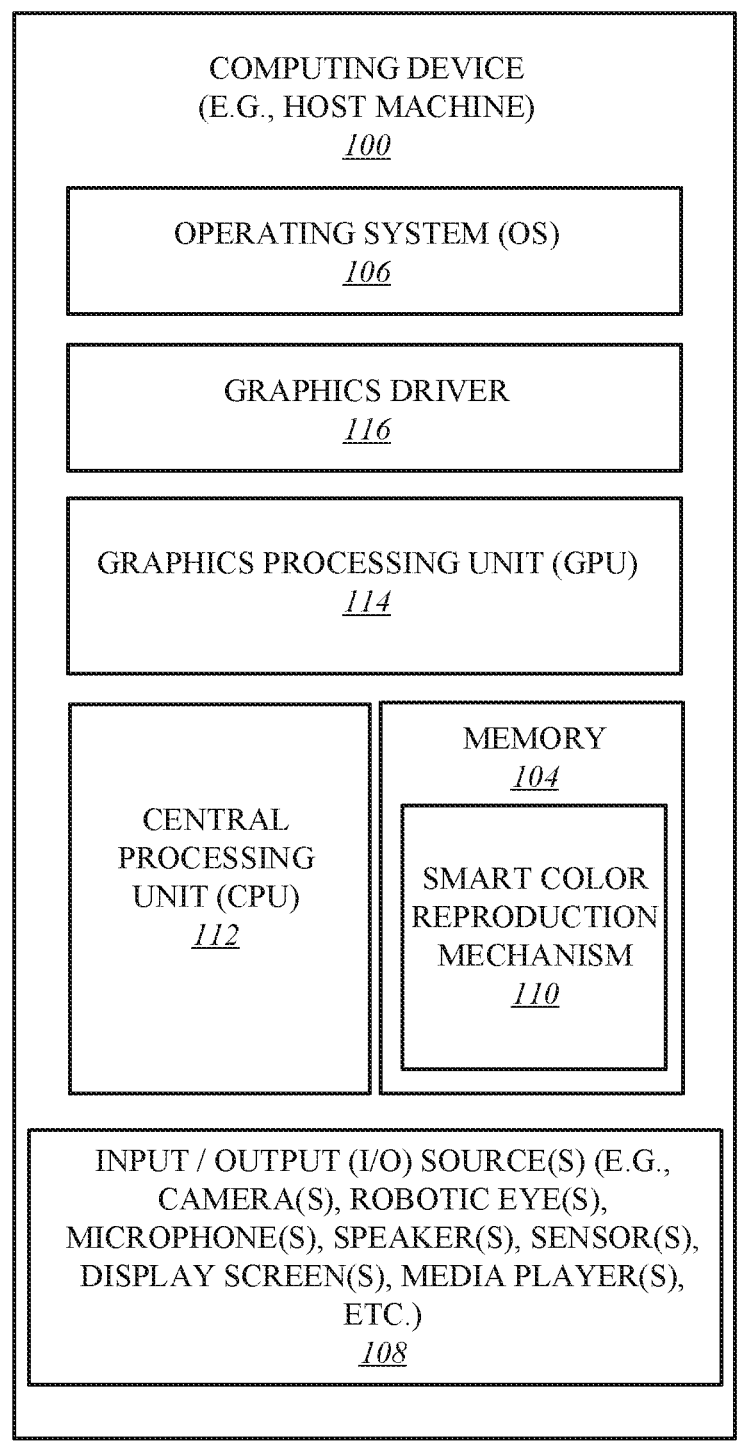
FIG. 1 illustrates a computing device employing a smart color reproduction mechanism according to one embodiment.

FIG. 1 illustrates a computing device 100 employing a smart color reproduction mechanism ("color mechanism") 110 according to one embodiment. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", and "mechanism" may include, by way of example, software or hardware and/or a combination thereof, such as firmware.

In one embodiment, as illustrated, color mechanism 110 may be hosted by memory 108 in communication with I/O source(s) 104, such as microphones, speakers, etc., of computing device 100. In another embodiment, color mechanism 110 may be part of or hosted by operating system 106. In yet another embodiment, color mechanism 110 may be hosted or facilitated by graphics driver 116. In yet another embodiment, color mechanism 110 may be hosted by or part of graphics processing unit ("GPU" or simply graphics processor") 114 or firmware of graphics processor 114. For example, color mechanism 110 may be embedded in or implemented as part of the processing hardware of graphics processor 114. Similarly, in yet another embodiment, color mechanism 110 may be hosted by or part of central processing unit ("CPU" or simply "application processor") 112. For example, color mechanism 110 may be embedded in or implemented as part of the processing hardware of application processor 112.

In yet another embodiment, color mechanism 110 may be hosted by or part of any number and type of components of computing device 100, such as a portion of color mechanism 110 may be hosted by or part of operating system 116, another portion may be hosted by or part of graphics processor 114, another portion may be hosted by or part of application processor 112, while one or more portions of color mechanism 110 may be hosted by or part of operating system 116 and/or any number and type of devices of computing device 100. It is contemplated that embodiments are not limited to certain implementation or hosting of color mechanism 110 and that one or more portions or components of color mechanism 110 may be employed or implemented as hardware, software, or any combination thereof, such as firmware.

Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
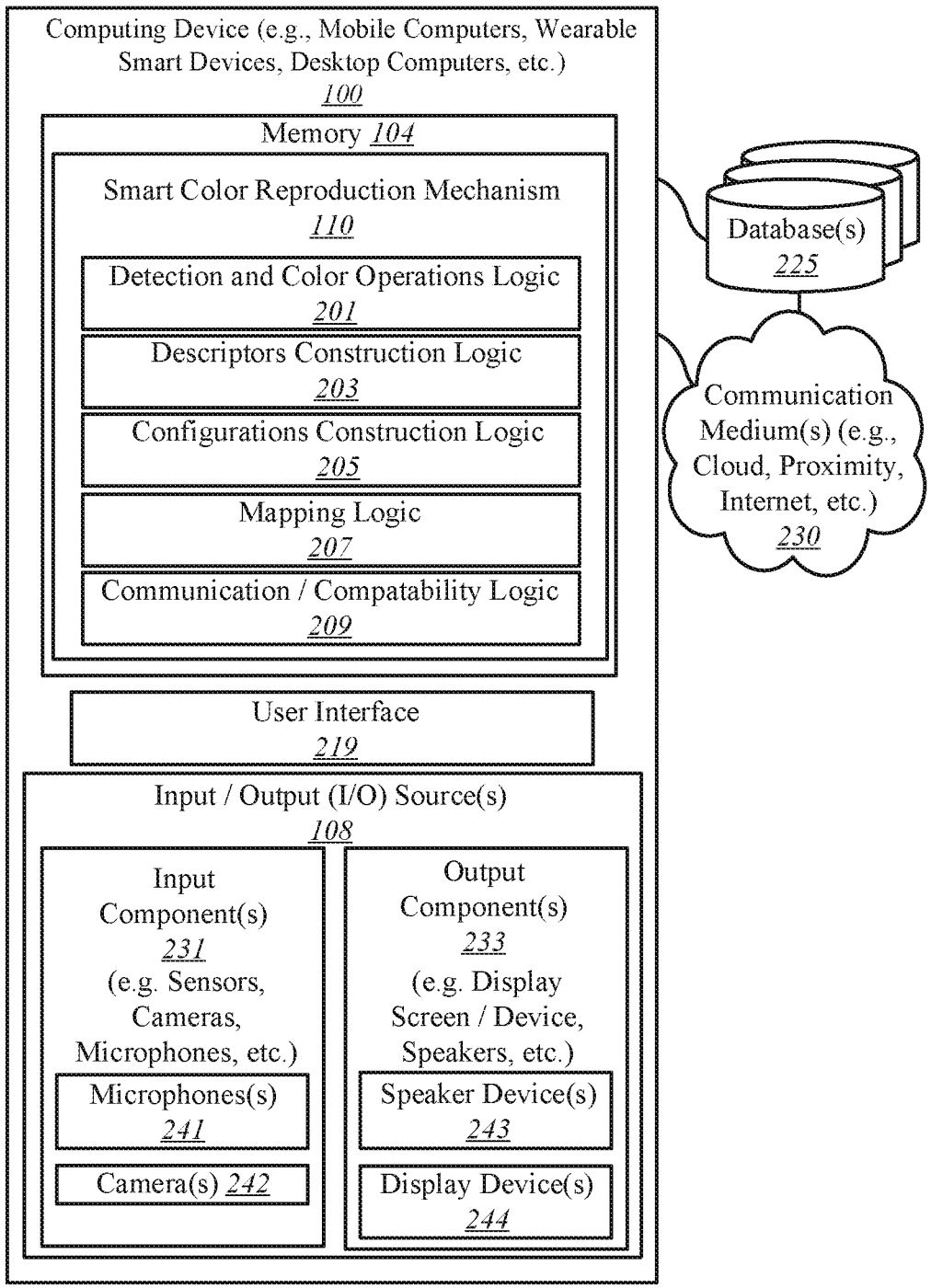
FIG. 2 illustrates a smart color reproduction mechanism according to one embodiment.

FIG. 2 illustrates automatic smart color reproduction mechanism 110 of FIG. 1 according to one embodiment. For brevity, many of the details already discussed with reference to FIG. 1 are not repeated or discussed hereafter. In one embodiment, color mechanism 110 may include any number and type of components, such as (without limitations): detection and color operations logic 201; descriptor construction logic 203; configurations construction logic 205; mapping logic 207; and communication/compatibility logic 209.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", and "mechanism" may include, by way of example, software or hardware and/or a combination thereof, such as firmware. For example, logic may itself be or include or be associated with circuitry at one or more devices, such as application processor 112 and/or graphics processor 114 of FIG. 1, to facilitate or execute the corresponding logic to perform certain tasks, such as visual description circuitry may itself be or facilitate or execute visual description logic 203 to perform visual description-related operations (such as computing LBP).

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into computing device 100.

It is contemplated that embodiments are not limited to any number or type of microphone(s) 241, camera(s) 243, speaker(s) 243, display(s) 244, etc. For example, as facilitated by detection and color operations logic 201, one or more of microphone(s) 241 may be used to detect speech or sound simultaneously from users, such as speakers. Similarly, as facilitated by detection and color operations logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or a video stream.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

As mentioned earlier, a typical ISP of a color digital camera system contains two blocks or operations that are responsible for color reproduction accuracy, WB and CC, where the latter is also known as color correction. The role of WB is to estimate the ambient illumination and compensate for its effect to render an image that is as close as possible to what a human observer would have perceived, such as to achieve color constancy under different illuminations. The role of CC is to transform the WB-corrected image data into a standard color space since the spectral sensitivities of the sensor color channels rarely match those of the target or desired color space. Further, CC can be performed by, for example, means of a color conversion matrix, which is also known as color correction matrix (CCM).

However, such conventional techniques lack color discipline such that some of the image colors often fall outside the gamut, which then leads to loss of certain details as well as unnatural and/or unpleasant color reproduction. For example, after the application of CC, and possibly color enhancement (CE), some of the image colors having values fall outside a target color gamut. Any attempt at hard clipping of the OOG colors may cause detail loss and/or unnatural or unpleasant color reproduction.

Embodiments provide for a novel technique for smart reproduction of colors in digital camera systems, as facilitated by color mechanism 110. In one embodiment, novel color GM-based architecture and processes are offered to ensure a proper application and use of GM-based solutions after color correction and/or enhancement to bring the OOG colors inside the target gamut, providing high quality color reproduction and detail preservation in colored images.

This novel technique provides for a computationally-efficient architecture and method for GM for facilitating improved color reproduction and detail preservation for obtaining high image quality. Further, for example, color appearance representations (e.g., luma, chroma, hue predictors) are exploited through this novel technique such that for a projection of a red green blue (RGB) cube onto a hexagon in a chromaticity plane, this novel technique, as facilitated by color mechanism 110, may analytically calculate a compact parametric gamut boundary descriptor (GBD) representation for a luma-chroma plane as a function of the hue angle, where this representation needs to be calculated merely once.

In one embodiment, this compact parametric representation of hue-dependent GBDs is computed to facilitate certain results, such as 1) a computationally-efficient implementation and architecture that can flexibly support various gamut mapping algorithms (GMAs) and 2) a high-quality artifact-free color reproduction, since the mapping of colors follows a GBD representation that is a continuous function of the hue angle.

Stated differently, high-quality through this novel gamut mapping solution allows for an artifact-free improved color reproduction and detail presentation of colored images. Similarly, computational efficiency allows for GMs to be performed with zero CPU residency and, in case of any hardware ISP, only a small area dedicated to such hardware. Further, the flexibility of this novel technique allows for the use of a variety of gamut mapping solutions with varying color reproduction properties without having to change the ISP GM block design.

It is contemplated that detection and color operations logic 201 is used to perform various tasks involving receiving, transmitting, detecting, observing, and monitoring, etc., of a variety of data, such as: 1) images (e.g., still images, video streams, etc.) captured by one or more of camera(a) 242; 2) sounds captured by microphone(s) 241; 3) information being communicated between computing device 100 and other devices; 4) working and performance of hardware and/or software components of computing device 100; and 5) computational and analytical application and use of data, such as with respect to equations, formulae, etc.; and/or the like.

In one embodiment, detection and color operations logic 201 detects color correction and enhancement operations of colored images at computing device 100 and as necessary and appropriate, communicates the need for computing and applying a GM-based solution to descriptor construction logic 203. In one embodiment, descriptor construction logic 203 may be used for facilitating an operation for construction of hue-dependent gamut boundary descriptors ("descriptors"), where such an operation may be performed once and offline.

For example, using descriptor construction logic 203, let the color appearance attributes (luma, chroma, and hue predictors) of an RGB triplet P=(R, G, B), where R, G and B E [0.0,1.0], be defined as follows, where $$\text{Luma}(P) = 1/3[R + G + B]$$

$$\text{Chroma}(P) = \sqrt{\left(\frac{1}{2}(2R - G - B)\right)^2 + \left(\frac{\sqrt{3}}{2}(G - B)\right)^2}$$

$$\text{Hue}(P) = 60 \times \begin{cases} \text{zero, if } \max(R, G, B) = \min(R, G, B), \text{ i.e. neutral colors} \\ \frac{G - B}{\max(R, G, B) - \min(R, G, B)} \text{mod6, if } \max(R, G, B) = R \\ \frac{B - R}{\max(R, G, B) - \min(R, G, B)} + 2, \text{ if } \max(R, G, B) = G \\ \frac{R - G}{\max(R, G, B) - \min(R, G, B)} + 4, \text{ if } \max(R, G, B) = B \end{cases}$$

Now, descriptor construction logic 203 allows the hue range to be divided into 60-degree-wide slices, and each slice is further divided into N sectors of uniform angular spacing, such as for 10-degree uniform angular step, there would be 6 hue sectors for each 60-degree hue slice.

Figure 4A:
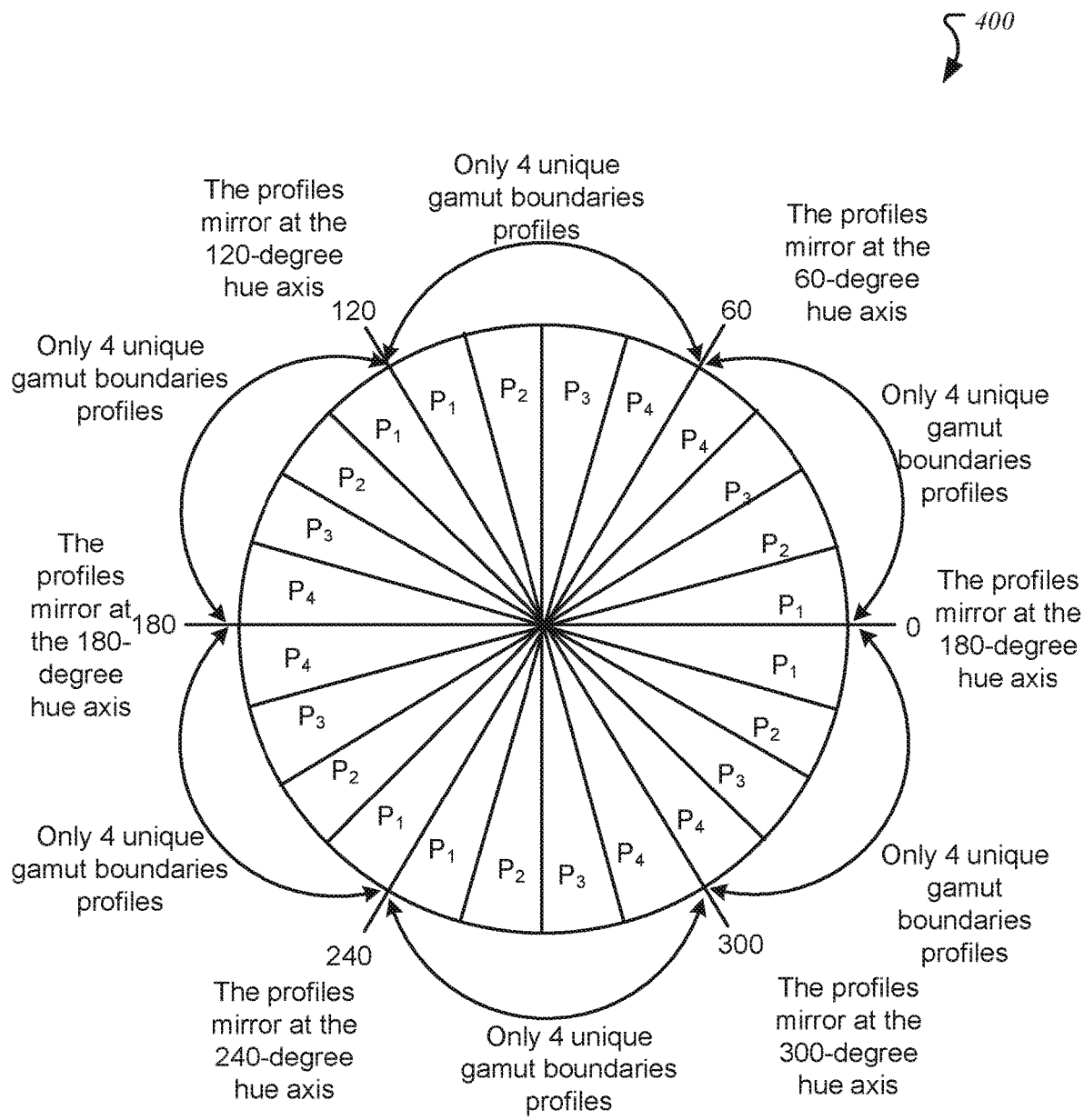
FIG. 4A illustrates a graphical representation of a hue range partitioning according to one embodiment.

Following the hue, luma and chroma definitions above, which are based on projection of the RGB cube onto a hexagon in the chromaticity plane, the RGB color gamut boundaries profiles in the constant-hue (luma-chroma) planes exhibit a symmetry every 60 degrees of hue, as illustrated in FIG. 4A for N=4 and uniform hue angular step of 15 degrees. At a given hue angle $\varphi \in [0,60]$, the gamut boundary descriptor 4, may be represented by a triangle (two-segment, piece-wise linear function), whose cusp (e.g., point of maximum chroma in the luma-chroma plane) changes with the hue angle according to a high-order polynomial for the chroma ($\text{Chroma}_{cusp}(\varphi)$), and a linear function for the luma ($\text{Luma}_{cusp}(\varphi)$), where $$f_{\varphi(luma)} = f_\varphi(\text{luma}; \text{Chroma}_{cusp}(\varphi), \text{Luma}_{cusp}(\varphi))$$

Figure 4B:
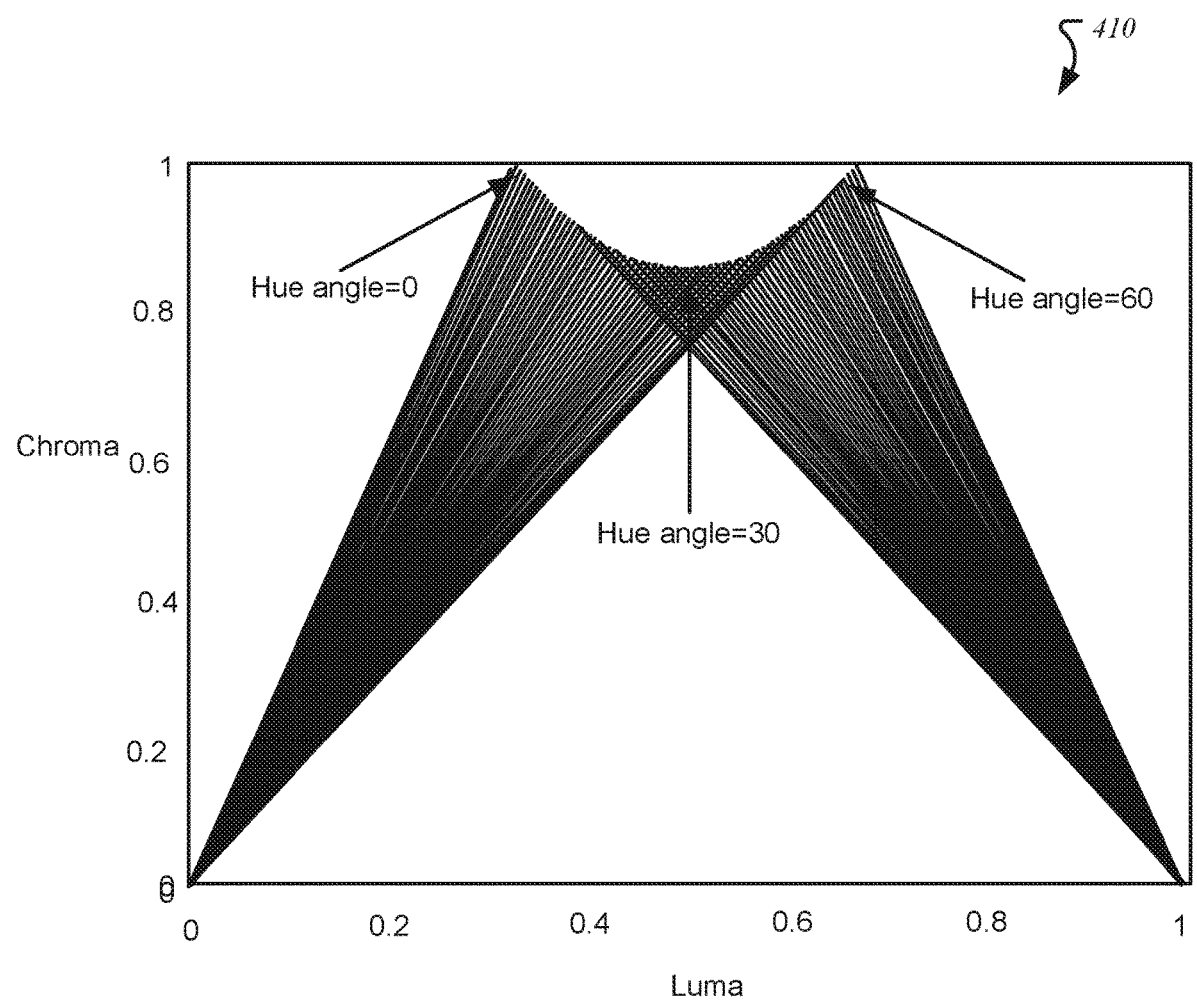
FIG. 4B illustrates a graphical representation of gamut boundaries profiles in a luma-chroma plane for varying hue angles according to one embodiment.
Figure 4C:
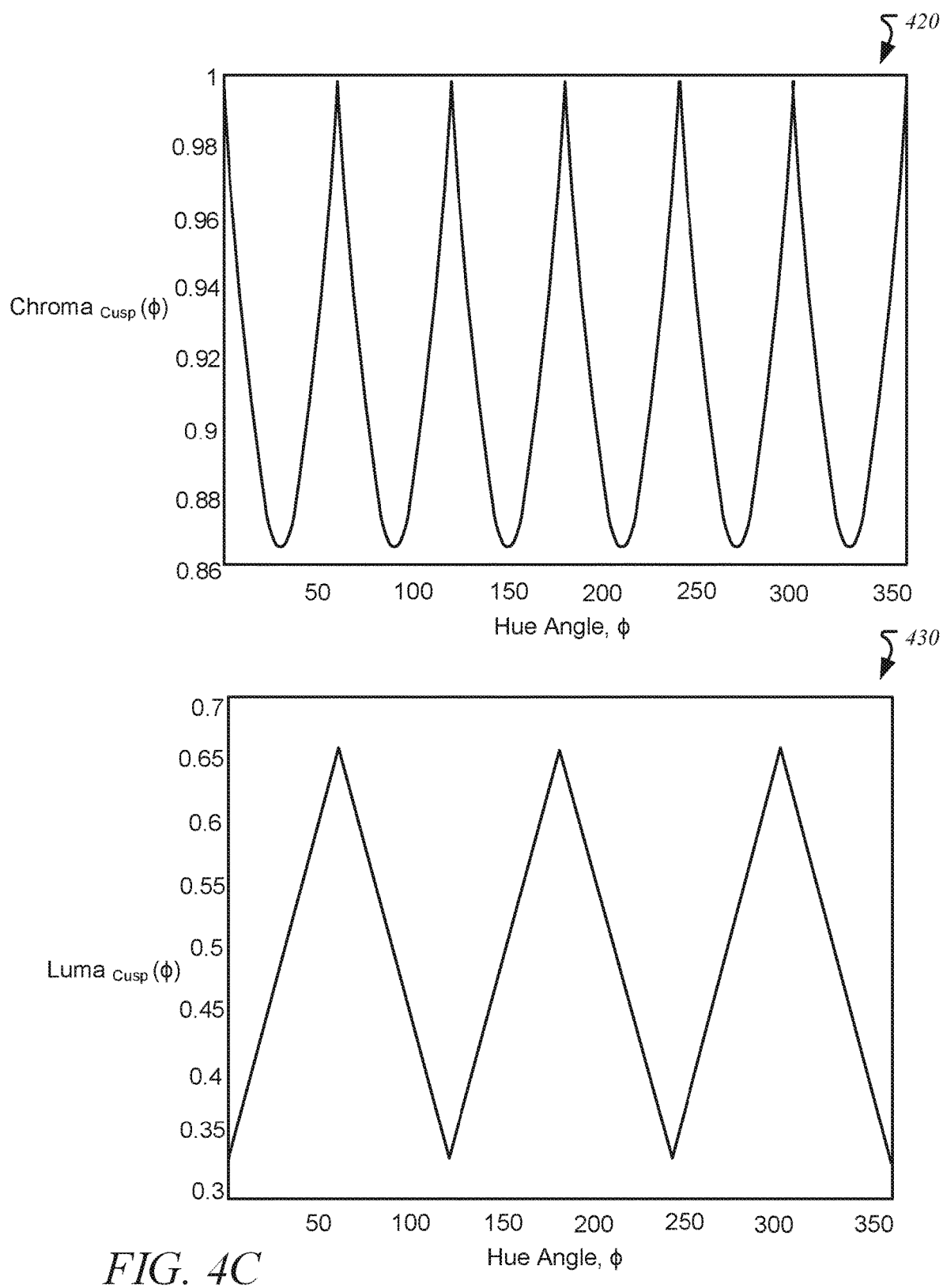
FIG. 4C illustrates graphical representations of gamut boundary descriptor cusp chroma and luma values as a function of a hue angle according to one embodiment.

This is further illustrated in FIGS. 4B and 4C. As illustrated, FIG. 4A shows a graphical representation 400 of hue range partitioning for N=4. FIG. 4B illustrates a graph 410 of gamut boundaries profiles in a luma-chroma plane for different hue angles in a range [0, 60]. For example, as illustrated in FIG. 4B, the gamut boundaries vary with the changing hue angle, such as a pixel of certain chroma and luma values may be OOG at a given hue angle, while another pixel with the same chroma and luma values may be IG at a different hue angle. FIG. 4C illustrates graphs 420, 430 where the GBD cusp chroma values and luma values, respectively, are shown as a function of a hue angle.

Referring back to FIG. 2, the GBD triangle base (which rests on the luma axis) has fixed start and end points in the luma-chroma plane; [0.0,0.0] and [1.0,0.0], respectively. Consequently, all the GBDs $\{f_\varphi(\text{luma}; \text{Chroma}_{cusp}(\varphi), \text{Luma}_{cusp}(\varphi)), \forall \varphi \in [0,60]\}$ may be compactly represented by the coefficients of the first-order polynomial $\text{Luma}_{cusp}(\varphi)$ and the nth-order polynomial $\text{Chroma}_{cusp}(\varphi)$ (where n=2 or 3 is sufficient).

Now, due to the mirroring of the GBDs every 60 degrees, a set of GBDs for $\varphi \in [0,60]$ is sufficient for representing the whole hue range, such as range [0 360]. This results in a very compact, continuous representation of the GBDs as a function of the hue angle. As mentioned above, in one embodiment, this GBD representation may need be calculated merely once by descriptor construction logic 203 and further, this representation may be transferred to or stored in a GM block just once. For example, this may be performed using a software abstraction layer or by simply hard-coding (for writing) the configurations to the GM block.

Continuing with the process, in one embodiment, configurations construction logic 205 may then be triggered to perform one or more operations to facilitate construction of gamut mapping configurations. For example, this operation of facilitating construction of gamut mapping configurations may be performed offline and once per gamut mapping algorithm and the desired color reproduction property.

In one embodiment, sequential and separable chroma and luma mappings may be applied to perform gamut mapping in a computationally-efficient manner. For example, in some embodiments, a GM block is configured by configurations construction logic 205 to perform chroma mapping, followed by luma mapping, or vice versa. Further, in some embodiments, one or more both of chroma mapping and luma mapping may be disabled to allow for support for varying desired color reproduction properties.

Figure 4D:
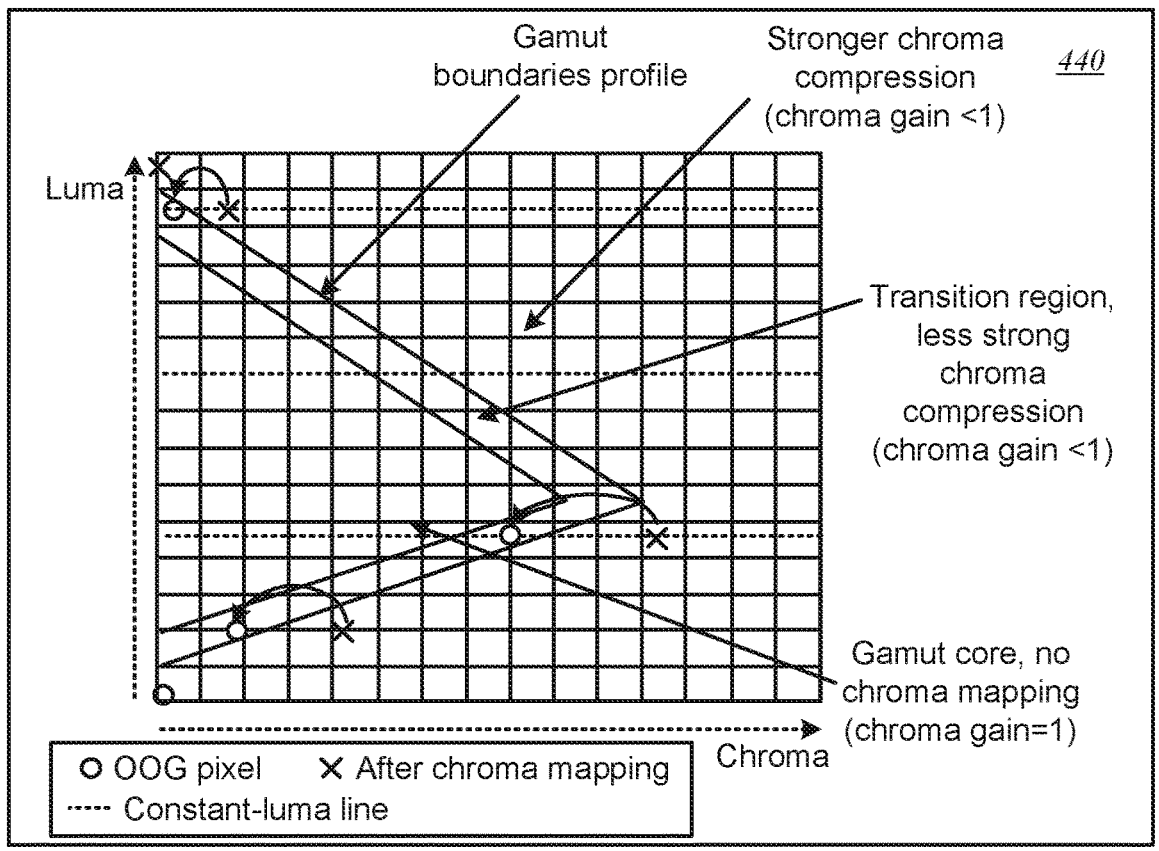
FIG. 4D illustrates graphical representations of chroma mapping (scaling) and luma mapping (shifting) according to one embodiment.
Figure 4D:
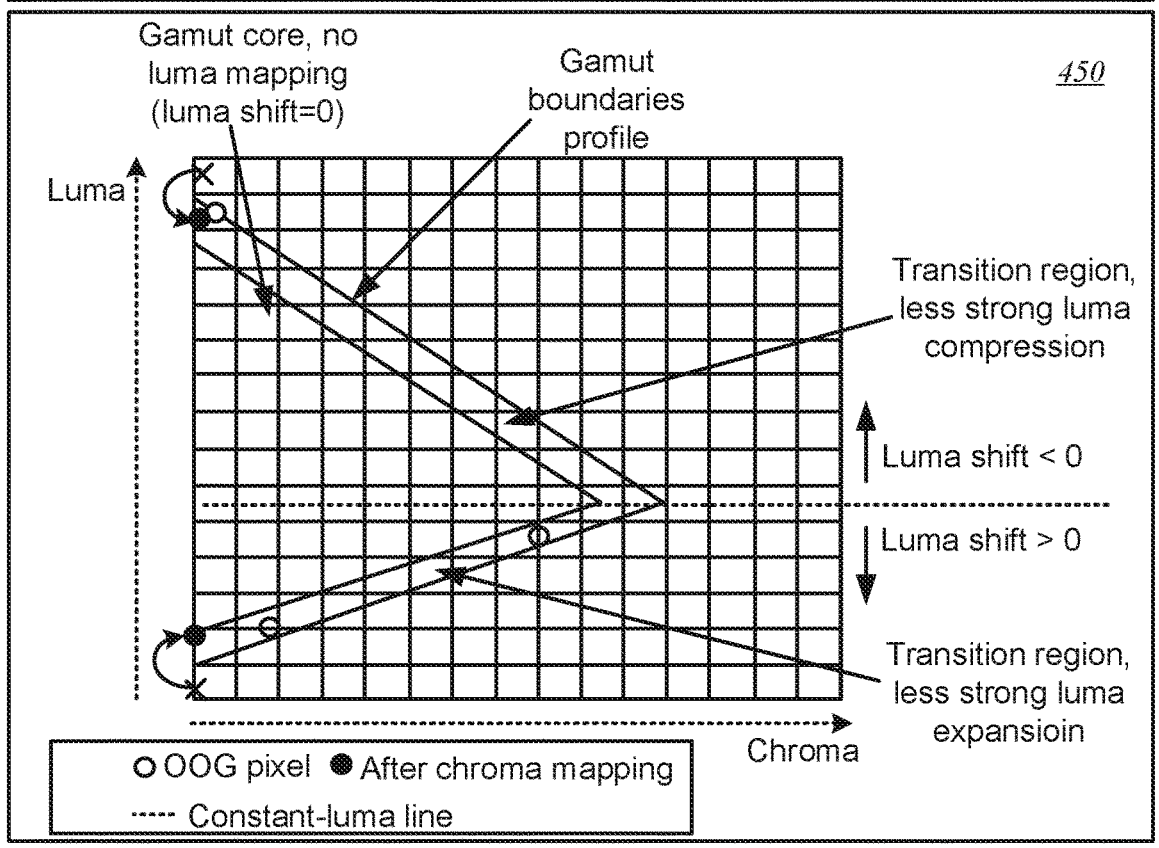

Further, for example, chroma mapping may be used by configuration construction logic 205 to perform chroma scaling along constant-luma lines, while luma mapping performs luma shifting along constant-chroma lines, as depicted in FIG. 4D. As illustrated, FIG. 4D depicts graphs 440 and 450 showing chroma mapping (scaling) and luma mapping (shifting), respectively. For example, chroma mapping may be followed by luma mapping. For example, as illustrated with respect to chroma mapping (scaling) of graph 440 of FIG. 4D, gamut-core-preserving and chroma mapping are performed along constant-luma lines (with configurable gamut core ratio), where, as illustrated, pixels that lie inside the gamut core are left intact, while pixels that lie outside the gamut core experience stronger chroma scaling and/or compression than those inside the transition region between the gamut boundary and the core boundary. Further, the mapping follows a linear or non-linear function of the pixel chroma distance from the gamut core boundary, where the mapping function parameters are defined merely once and stored as configuration in the hardware via an abstraction layer.

Similarly, with respect to luma mapping (shifting) as shown in graph 450 of FIG. 4D, gamut-core-preserving and luma mapping are performed along constant-chroma lines (with configurable gamut core ratio), where pixels that lie inside the gamut core are left intact, while pixels that lie outside the gamut core experience stronger luma shifting (positive or negative) than those inside the transition region between the gamut boundary and the core boundary. This mapping follows a linear or non-linear function of the pixel luma distance from the gamut core boundary. The mapping function parameters may be defined merely once and stored as configuration in the hardware via an abstraction layer.

Referring back to FIG. 2, gamut-core-preserving mapping strategy may be pursued, such as any pixels that lie inside the gamut core (as defined by a configurable ratio parameter) may be left intact, while any pixels that lie outside the gamut core may experience stronger chroma scaling and/or luma shifting than those pixels that are inside a transition region between the gamut boundary and the core boundary. Further, any mapping along the constant-luma lines or constant-chroma lines may be performed in diverse ways, such as following a linear, piece-wise linear, sigmoidal or nonlinear function.

In one embodiment, a set of gamut mapping configuration parameters may include one or more of 1) an order of mappings and which mappings to enable, 2) a core ratio, 3) an upper bound on a (positive-valued) source chroma, 4) upper and lower bounds on a positive or negative valued sourced luma (due to correction), and 5) parameters of the chroma and luma mapping functions. In one embodiment, these configurations are defined merely once per GMA and the desired color reproduction property. Further, they are once transferred in a GM block such that this is done using a software abstraction layer or through hard-coding (or writing) of configurations to the GM block.

Upon construction of configurations by configurations construction logic 205, in one embodiment, mapping logic 207 is then triggered for facilitating gamut mapping via sequential (separable) chroma and luma mappings. For example, mapping logic 207 may be used to perform one or more of the following per-pixel operations in a GM block: 1) for each incoming pixel, the luma, chroma, and hue values are calculated as facilitated by mapping logic 207 and further, based on the hue value, a corresponding GBD is found by evaluating any polynomials $Luma_{cusp}(\varphi)$ and $Chroma_{cusp}(\varphi)$ for the pixel hue value, followed by deciding of the state of the pixel, such as being OOG, in-the-transition-region (ITR), or in-core (IC) pixel; and 2) for IC pixels, mapping may not be performed. For example, for ITR and OOG pixels, chroma and luma mappings are performed, following the mapping functions' parameters that were previously stored to the GM block as configurations, where the operations are interpreted in the color appearance space, but are performed on the RGB values.

In one embodiment, the one or more of the per-pixel operations in the GM block further include: 3) a clamping operation being performed at the end of the block processing to guarantee that the output from the block is in the target range, such as when one or both of the chroma and luma mappings are disabled; and 4) all of the above mentioned three per-pixel operations may be performed and implemented efficiently and in parallel.

In one embodiment, upon performance of all the operations associated with construction of hue-dependent gamut boundary descriptors as facilitated by descriptor construction logic 203, construction of gamut mapping configurations as facilitated by configurations construction logic 205, and gamut mapping via sequential (separable) chroma and luma mappings as facilitated by mapping logic 207, then the outcome (e.g., resulting data, observations, calculations, etc.) of such operations is executed or applied to obtain the best results with regard to the digital colored images at computing device 100.

Some of the examples of such results (using mild, linear chroma mapping) may include bringing improved image quality, such as improved detail preservation and color reproduction, using gamut mapping. Similarly, for example, parametric GBD representation may bring about continuous color mappings across different hues without introducing color artifacts, where various chroma and/or luma mappings are implemented using different color reproduction intent and/or properties. However, the continuity of the mapping across different hues is guaranteed due to the parametric representation of the GBDs.

Figure 4E:
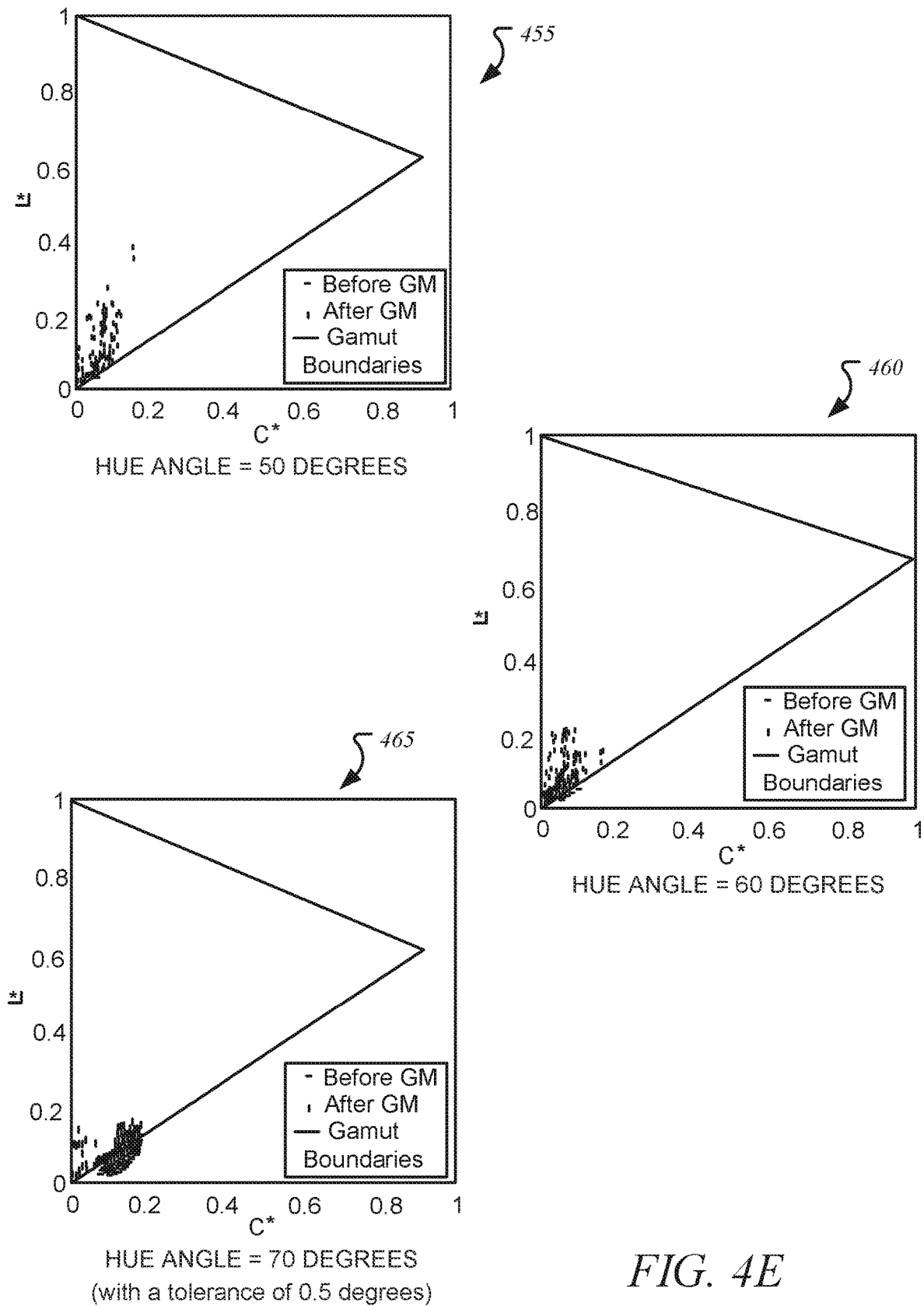
FIG. 4E illustrates graphical representations of effects of chroma mapping on in-gamut and out-of-gamut pixels according to one embodiment.

For example, as illustrated with respect to graphs 455, 460, and 465 of FIG. 4E, the chroma mapping of the OOG and in-the-transition-region pixels, following the gamut-core preserving strategy, results in an improved detail preservation and color reproduction of digital colored images without introducing any artifacts or detail losses. For example, in case of colored images of green grass, natural color reproduction and their textures can be preserved, where the gamut-core preserving strategy could keep the in-gamut-core pixels intact, without having to alter most of the in-gamut chromaticities and further, without having to observe any artifacts due to the parametric and continuous GBD representation. For example, graphs 455, 460, and 465 of FIG. 4E offer illustration of the effect of mild chroma mapping on the in-gamut and out-of-gamut pixels where the hue angle is 50 in graph 455, the hue angle is 60 in graph 460, and the hue angle is 70 (with a tolerance of 0.5 degrees) in graph 465.

Figure 4F:
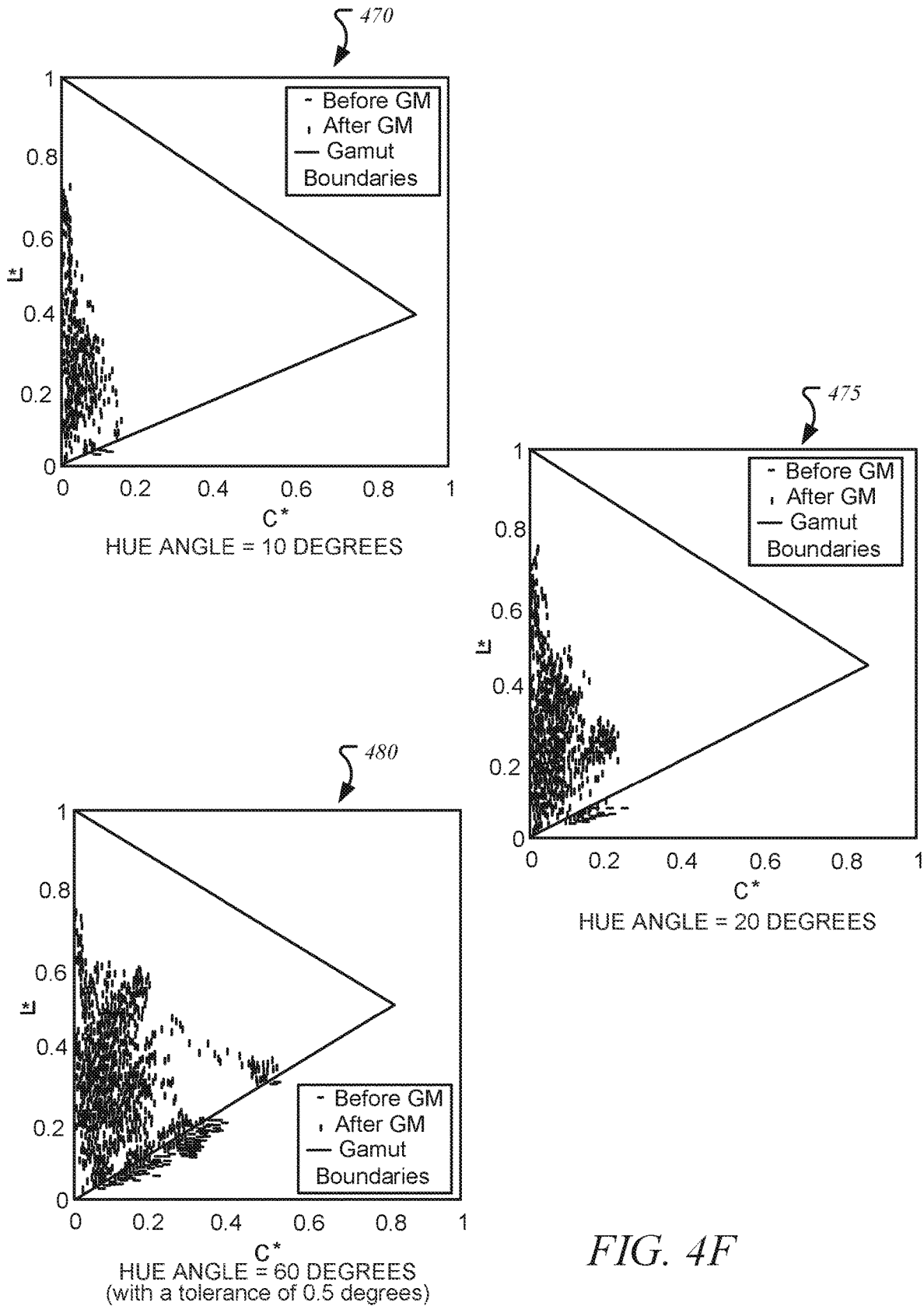
FIG. 4F illustrates graphical representations of effects of mild chroma mapping on in-gamut (IG) and out-of-gamut pixels according to one embodiment.

Similarly, using other objects, such as bananas, pears, etc., the chroma mapping of the OOG and in-the-transition-region pixels, following the gamut-core preserving strategy results in an improved color reproduction without having to introduce any artifacts or detail losses. For example, as illustrated in graphs 470, 475, and 480 of FIG. 4F, the natural color reproduction and textures of bananas and pears can be preserved using this novel gamut-core preservation strategy may keep the in-gamut-core pixels intact and thus not altering most of the in-gamut chromaticities and further, there are not artifacts observed due to parametric continuous GBD representation. For example, graphs 470, 475, and 480 of FIG. 4F offer illustration of the effect of mild chroma mapping on the in-gamut and out-of-gamut pixels where the hue angle is 10 in graph 470, the hue angle is 20 in graph 475, and the hue angle is 60 (with a tolerance of 0.5 degrees) in graph 480.

Figure 4G:
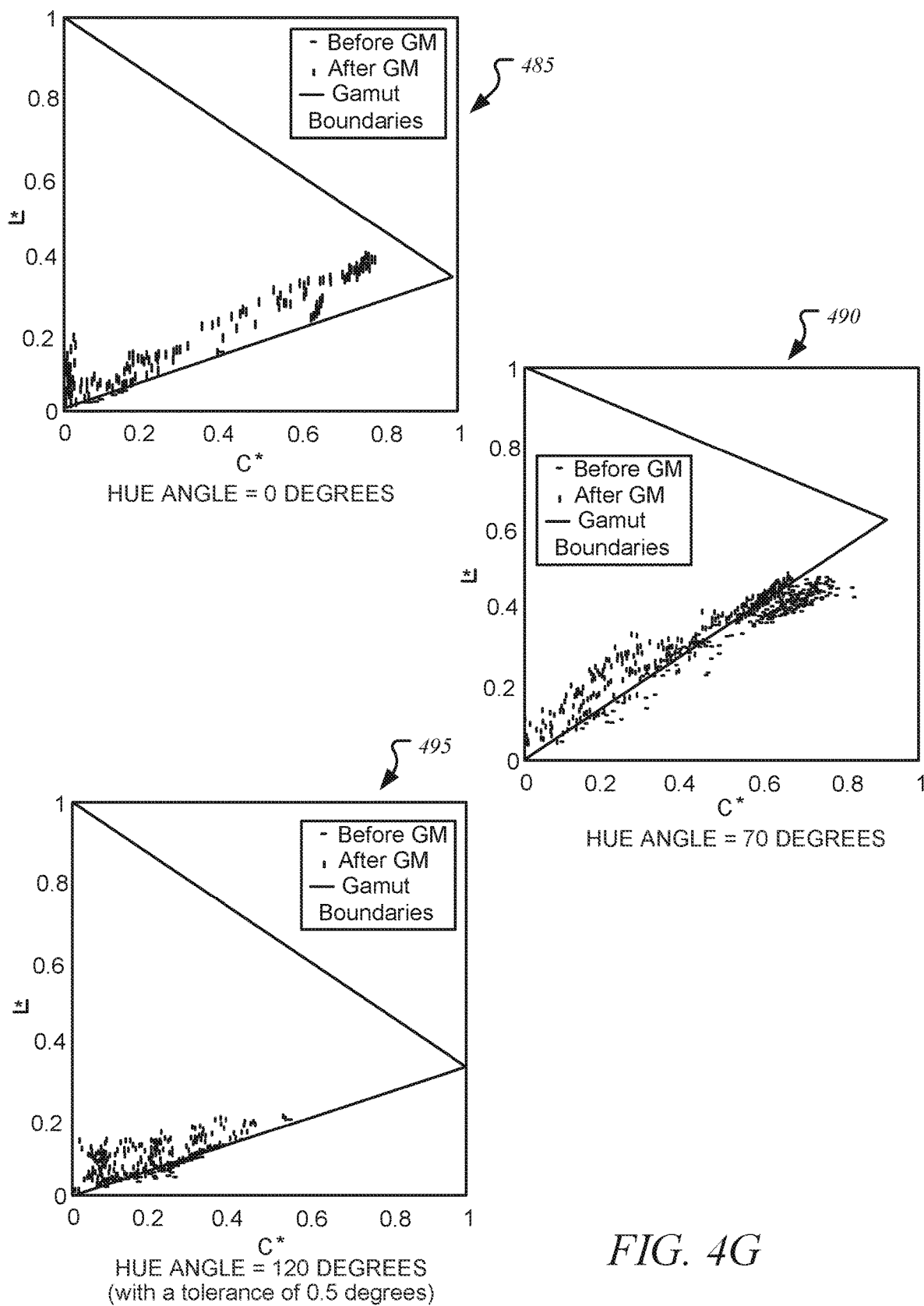
FIG. 4G illustrates graphical representations of effects of mild chroma mapping on in-gamut and out-of-gamut pixels according to one embodiment

Another set of daily-life objects could be a set of rather colorful highlighter pens, where again, using the novel technique for chroma mapping of the OOG and in-the-transition-region pixels, following the gamut-core preserving strategy that results in improved color reproduction without having to introduce artifacts or detail losses, as illustrated in graphics 485, 490, and 495 of FIG. 4G. For example, an orange pen may have more natural reproduction of color gradients, where all the textures are preserved. Further, this novel gamut-core preservation strategy may keep in-gamut-core pixels intact, without having to alter most of the in-gamut chromaticities and there are no artifacts observe due to the parametric, continuous GBD representation. For example, graphs 485, 490, and 495 of FIG. 4G offer illustration of the effect of mild chroma mapping on the in-gamut and out-of-gamut pixels where the hue angle is 0 in graph 485, the hue angle is 70 in graph 490, and the hue angle is 120 (with a tolerance of 0.5 degrees) in graph 495.

Referring back to FIG. 2, input component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinemagraphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "gamut", "gamut boundary descriptor", "gamut mapping configuration", "gamut mapping", "luma", "chrome", "hue", "ISP", "WC", "CC", "OOG", "IIR", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from reference-based tuning mechanism 110 to facilitate various embodiments including adding, removing, and/or enhancing certain features. For brevity, clarity, and ease of understanding of reference-based tuning mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

Figure 3:
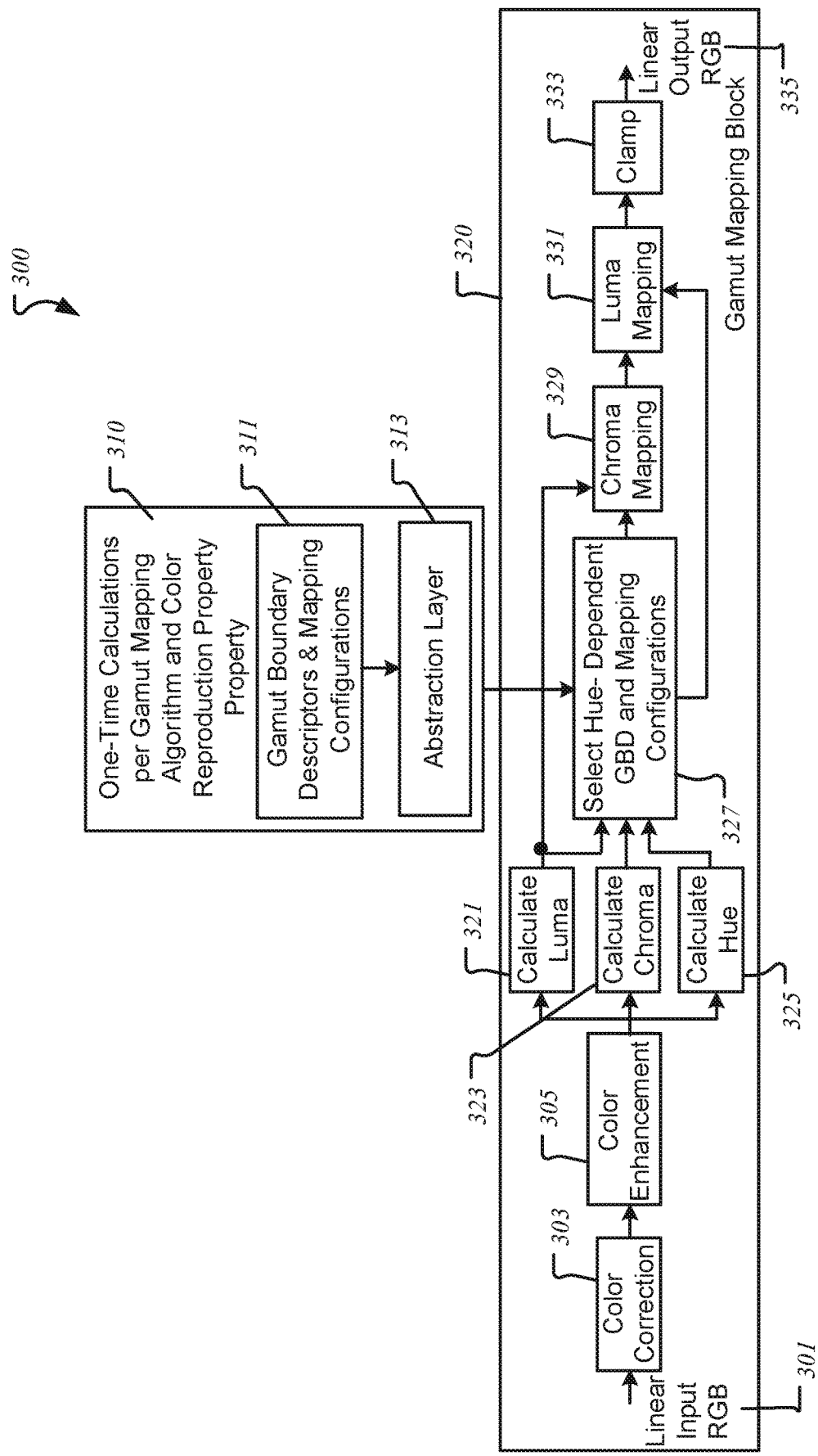
FIG. 3 illustrates a transaction sequence for gamut mapping (GM) and processing according to one embodiment.

FIG. 3 illustrates an embodiment of a transaction sequence 300 for gamut mapping and processing of digital colored images according to one embodiment. For brevity, many of the details previously discussed with reference to FIGS. 1-2 may not be discussed or repeated hereafter. Any processes or transactions with this and other illustrations may be performed by processing logic that may comprise hardware (e.g., circuitry, dedicated logic, programmable logic, etc.), software (such as instructions run on a processing device), or a combination thereof, as facilitated by color mechanism 110 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As previously stated, in colored photography or computer graphics or digital camera systems, a gamut simply refers to a color gamut, which further refers to a complete subset of colors within a color space, etc. Similarly, altering a gamut may refer to loss of details or colors of an image, such as when compared to the original colors or processes associated with the image.

As illustrated in FIG. 3, transaction sequence 300 begins with reception of liner input 301 (such as RGB input) for color correction at block 303, followed by color enhancement at block 303, as facilitated by detection and color operations logic 201 of FIG. 2. As illustrated, in one embodiment, this transaction sequence 300 is enhanced with one-time calculations per gamut mapping algorithm and color reproduction property at block 310 as facilitated by descriptor construction logic 203 and/or configurations construction logic 205 of FIG. 2. In one embodiment, block 310 provides for gamut boundary descriptors and mapping configurations at block 311 along with abstraction layer 313, where this information is then inputted into gamut mapping block 320 as facilitated by mapping logic 207 of FIG. 2.

For example, gamut mapping block 320 provides for multiple calculations, such as luma at block 321, chroma at block 323, and hue at block 325. In one embodiment, these calculations at blocks 321, 323, 325 may be facilitated by detection and color operations logic 201 in communication with mapping logic 207 of FIG. 2, where, for example, chroma mapping may be performed first, followed by luma mapping, and so forth. In the illustrated embodiment, upon performance of calculations at blocks 321, 323, 325, hue-dependent GBD and mapping configurations are received, from block 310, and selected at block 327. As described earlier, in this embodiment, chroma mapping is performed at block 329, then luma mapping is performed at block 331, followed by clamping at block 333, all within gamut mapping block 320, as facilitated by mapping logic 207 of FIG. 2. It is contemplated that clamping generally refers to a process for limiting a position to an area, such as in this case, clamping at block 333 of chroma and luma mappings from blocks 329, 331. This results in linear output 335 (such as RGB output).

It is contemplated and to be noted that transaction sequence 300 of FIG. 3 is merely one embodiment and that not all embodiments are limited as such. For example, this novel technique of gamut mapping solution provides for improved color reproduction and detail preservation within a flexible design that allows for varying color reproduction properties and gamut mapping alternatives, without having the need for any calibration or tuning. Further, this novel technique for provides for computationally-efficient architecture and algorithm and zero CPU residency (such as one-time configuration of the hardware block).

Embodiments are not limited to the implementation or order of transaction sequence 300 of FIG. 3 and that color mechanism 110 may be used to facilitate any number and type of relevant operations. For example, in some embodiments, a hue range may be divided into 24 sectors (having uniform or non-uniform angular spacing) and for each hue sector a set of illumination-dependent color correction matrices (CCMs) may be calculated. Further, for example, runtime interpolation of the illumination-dependent CCMs may be performed for each hue sector and then these interpolated 24 hue-dependent CCMs may be passed on to an ACM hardware block at a specified (tunable) run-rate. The hue-dependent CCMs/lookup tables (LUTs) may be stored in hardware, while a right CCM may be selected based on a hue value of the incoming pixel and the corresponding CCM (e.g., CCM 3×3) transform may be applied on that pixel.

Figure 5:
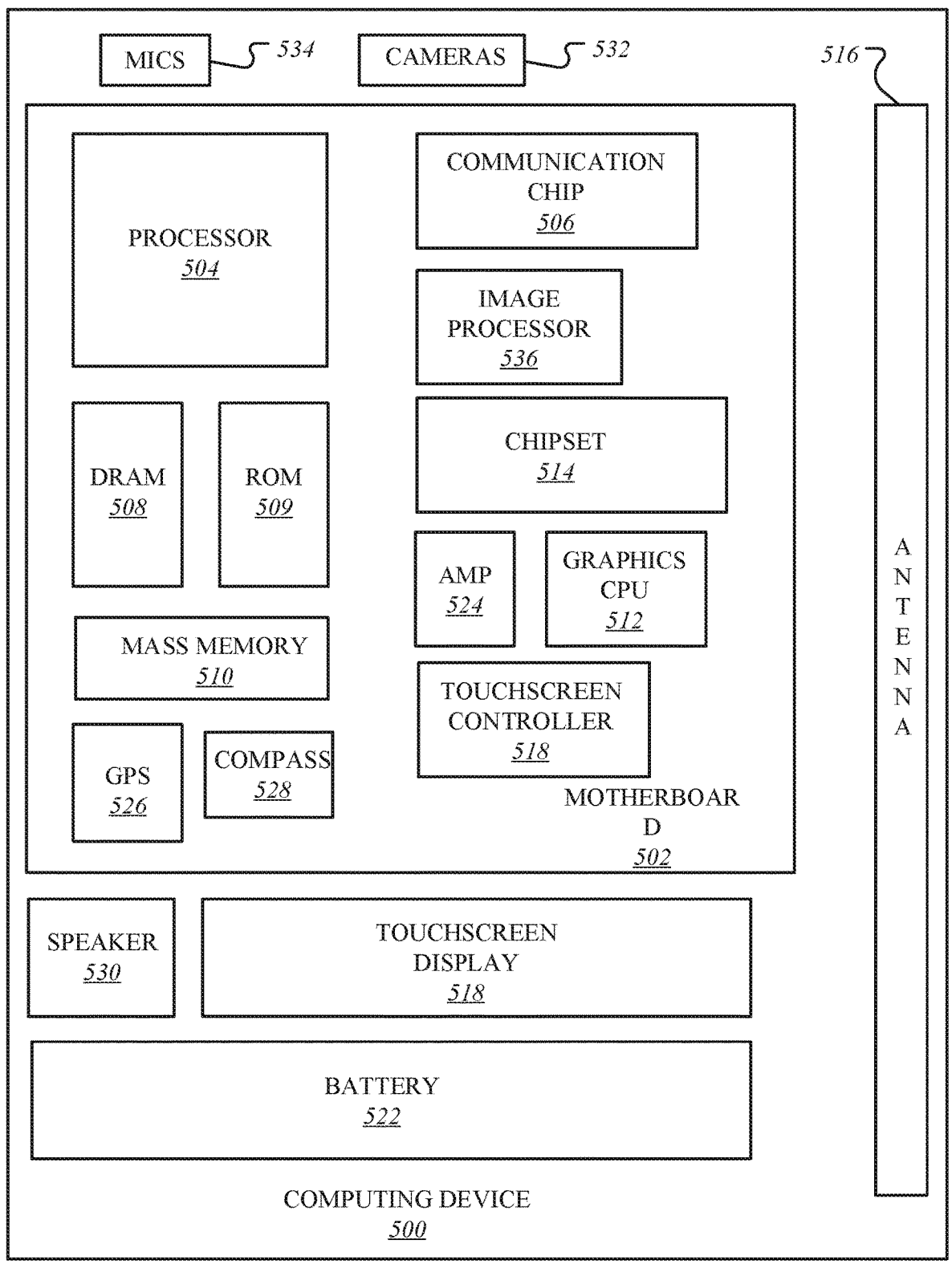
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
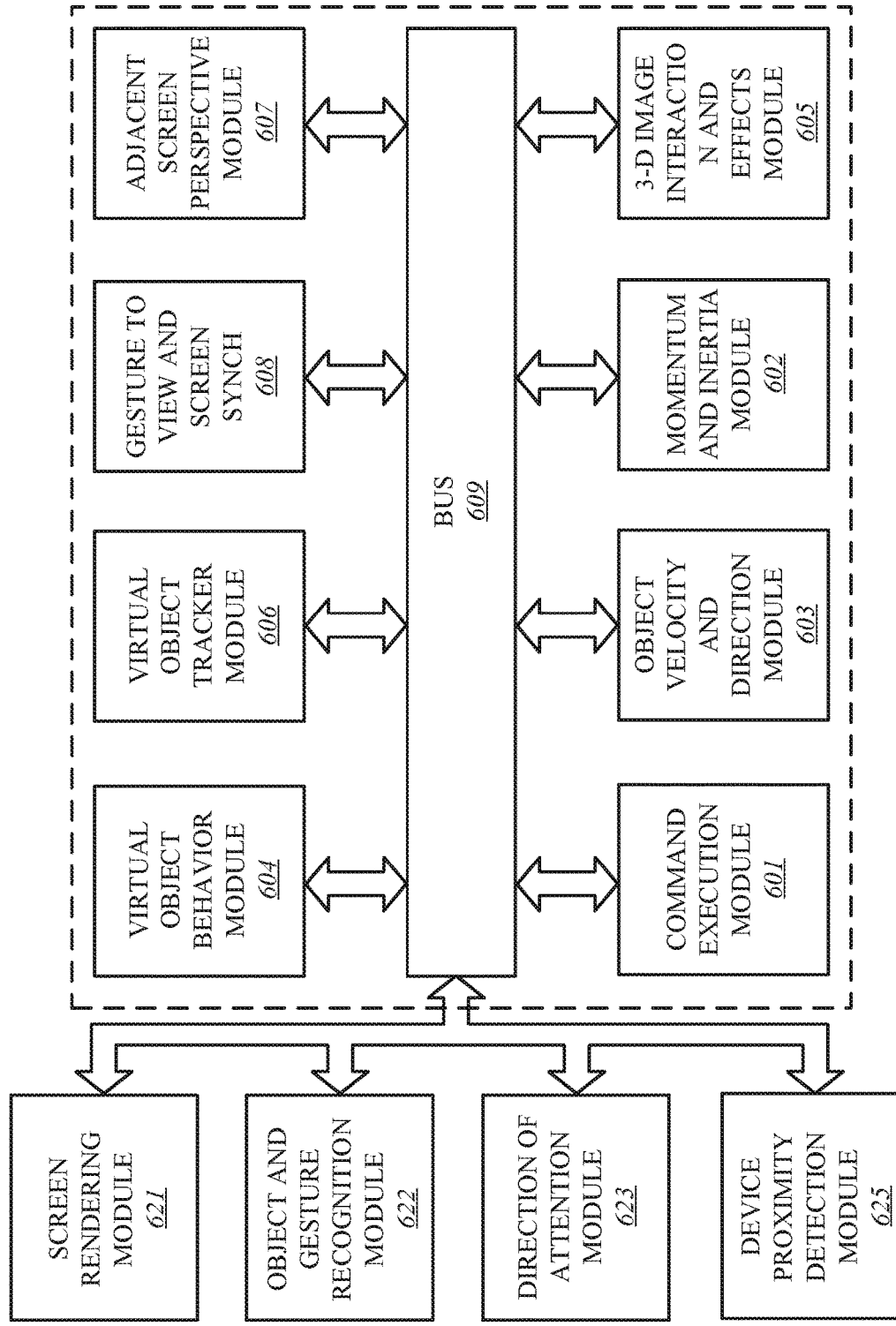
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605, 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate gamut mapping architecture and processing for color reproduction in image processing environments, the apparatus comprising: one or more processors to: compute one or more of gamut boundary descriptors and mapping configurations associated with a colored image captured using one or more cameras; and perform gamut mapping of color representation of the image based on the one or more of the gamut boundary descriptors and the mapping configurations, wherein the gamut mapping to facilitate color reproduction of the image.

Example 2 includes the subject matter of Example 1, wherein the one or more processors are further to: facilitate a color correction operation on linear red green blue (RGB) data associated with the image, wherein the image is received as a linear RGB input; and facilitate a color enhancement operation on the color corrected linear RGB data associated with the image.

Example 3 includes the subject matter of Examples 1-2, wherein the one or more processors are further to: calculate luma associated with the color enhanced linear RGB data; calculate chroma associated with the color enhanced linear RGB data; and calculate hue associated with the color enhanced linear RGB data.

Example 4 includes the subject matter of Examples 1-3, wherein the one or more processors are further to select and apply the one or more of the gamut boundary descriptors and the mapping configurations to facilitate the gamut mapping including hue-dependent gamut mapping based on the calculated hue.

Example 5 includes the subject matter of Examples 1-4, wherein the gamut mapping comprises chroma mapping based on the calculated chroma and the one or more of the gamut boundary descriptors and the mapping configurations.

Example 6 includes the subject matter of Examples 1-5, wherein the gamut mapping comprises luma mapping based on the calculated luma and the one or more of the gamut boundary descriptors and the mapping configurations.

Example 7 includes the subject matter of Examples 1-6, wherein the one or more processors are further to generate a linear RGB output based on the gamut mapping, wherein the one or more processors comprise one or more of a graphics processor and an application processor, wherein the graphics processor and the application processor are co-located on a common semiconductor package.

Some embodiments pertain to Example 8 that includes a method facilitating gamut mapping architecture and processing for color reproduction in image processing environments, the method comprising: computing one or more of gamut boundary descriptors and mapping configurations associated with a colored image captured using one or more cameras; and performing gamut mapping of color representation of the image based on the one or more of the gamut boundary descriptors and the mapping configurations, wherein the gamut mapping to facilitate color reproduction of the image.

Example 9 includes the subject matter of Example 8, further comprising: facilitating a color correction operation on linear red green blue (RGB) data associated with the image, wherein the image is received as a linear RGB input; and facilitating a color enhancement operation on the color corrected linear RGB data associated with the image.

Example 10 includes the subject matter of Examples 8-9, further comprising: calculating luma associated with the color enhanced linear RGB data; calculating chroma associated with the color enhanced linear RGB data; and calculating hue associated with the color enhanced linear RGB data.

Example 11 includes the subject matter of Examples 8-10, further comprising selecting and applying the one or more of the gamut boundary descriptors and the mapping configurations to facilitate the gamut mapping including hue-dependent gamut mapping based on the calculated hue.

Example 12 includes the subject matter of Examples 8-11, wherein the gamut mapping comprises chroma mapping based on the calculated chroma and the one or more of the gamut boundary descriptors and the mapping configurations.

Example 13 includes the subject matter of Examples 8-12, wherein the gamut mapping comprises luma mapping based on the calculated luma and the one or more of the gamut boundary descriptors and the mapping configurations.

Example 14 includes the subject matter of Examples 8-13, further comprising generating a linear RGB output based on the gamut mapping, wherein the method is facilitated by one or more processors comprising one or more of a graphics processor and an application processor, wherein the graphics processor and the application processor are co-located on a common semiconductor package.

Some embodiments pertain to Example 15 that includes a data processing system comprising a processing device coupled to a memory, the processing device to: computing one or more of gamut boundary descriptors and mapping configurations associated with a colored image captured using one or more cameras; and performing gamut mapping of color representation of the image based on the one or more of the gamut boundary descriptors and the mapping configurations, wherein the gamut mapping to facilitate color reproduction of the image.

Example 16 includes the subject matter of Example 15, wherein the processing device to facilitate a color correction operation on linear red green blue (RGB) data associated with the image, wherein the image is received as a linear RGB input; and facilitate a color enhancement operation on the color corrected linear RGB data associated with the image.

Example 17 includes the subject matter of Examples 15-16, wherein the processing device to: calculate luma associated with the color enhanced linear RGB data; calculate chroma associated with the color enhanced linear RGB data; and calculate hue associated with the color enhanced linear RGB data.

Example 18 includes the subject matter of Examples 15-17, wherein the processing device to: select and apply the one or more of the gamut boundary descriptors and the mapping configurations to facilitate the gamut mapping including hue-dependent gamut mapping based on the calculated hue.

Example 19 includes the subject matter of Examples 15-18, wherein the gamut mapping comprises chroma mapping based on the calculated chroma and the one or more of the gamut boundary descriptors and the mapping configurations.

Example 20 includes the subject matter of Examples 15-19, wherein the gamut mapping comprises luma mapping based on the calculated luma and the one or more of the gamut boundary descriptors and the mapping configurations.

Example 21 includes the subject matter of Examples 15-20, wherein the processing device to generate a linear RGB output based on the gamut mapping, wherein the processing device comprises one or more of a graphics processor and an application processor, wherein the graphics processor and the application processor are co-located on a common semiconductor package.

Some embodiments pertain to Example 22 that includes an apparatus facilitating automatic tuning of image signal processors using reference images in image processing environments, the apparatus comprising: means for computing one or more of gamut boundary descriptors and mapping configurations associated with a colored image captured using one or more cameras; and means for performing gamut mapping of color representation of the image based on the one or more of the gamut boundary descriptors and the mapping configurations, wherein the gamut mapping to facilitate color reproduction of the image.

Example 23 includes the subject matter of Example 22, further comprising means for facilitating a color correction operation on linear red green blue (RGB) data associated with the image, wherein the image is received as a linear RGB input; and means for facilitating a color enhancement operation on the color corrected linear RGB data associated with the image.

Example 24 includes the subject matter of Examples 22-23, further comprising means for calculating luma associated with the color enhanced linear RGB data; calculate chroma associated with the color enhanced linear RGB data; and means for calculating hue associated with the color enhanced linear RGB data.

Example 25 includes the subject matter of Examples 22-24, further comprising means for selecting and applying the one or more of the gamut boundary descriptors and the mapping configurations to facilitate the gamut mapping including hue-dependent gamut mapping based on the calculated hue.

Example 26 includes the subject matter of Examples 22-25, wherein the gamut mapping comprises chroma mapping based on the calculated chroma and the one or more of the gamut boundary descriptors and the mapping configurations.

Example 27 includes the subject matter of Examples 22-26, wherein the gamut mapping comprises luma mapping based on the calculated luma and the one or more of the gamut boundary descriptors and the mapping configurations.

Example 28 includes the subject matter of Examples 22-27, wherein the processing device to generate a linear RGB output based on the gamut mapping, wherein the apparatus comprises one or more of a graphics processor and an application processor, wherein the graphics processor and the application processor are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
one or more processors to:
compute one or more of gamut boundary descriptors and mapping configurations associated with a colored image captured using one or more cameras; and
perform gamut mapping of color representation of the image based on the one or more gamut boundary descriptors and mapping configurations, wherein the gamut mapping to facilitate color reproduction of the image, wherein the gamut mapping is customized based on selection of the one or more gamut boundary descriptors and mapping configurations, and application of the one or more gamut boundary descriptors and mapping configurations to calculations based on color corrections and color enhancements corresponding to a mapping type, wherein the one or more gamut boundary descriptors and mapping configurations are selected and applied based on their hue dependency as revealed through calculated hue.

2. The apparatus of claim 1, wherein the one or more processors are further to:
facilitate a color correction operation on linear red green blue (RGB) data associated with the image, wherein the image is received as a linear RGB input; and
facilitate a color enhancement operation on the color corrected linear RGB data associated with the image.

3. The apparatus of claim 2, wherein the one or more processors are further to:
calculate luma associated with the color enhanced linear RGB data;
calculate chroma associated with the color enhanced linear RGB data; and
calculate hue associated with the color enhanced linear RGB data.

4. The apparatus of claim 1, wherein the gamut mapping comprises chroma mapping based on the calculated chroma and the one or more of the gamut boundary descriptors and the mapping configurations.

5. The apparatus of claim 4, wherein the gamut mapping comprises luma mapping based on the calculated luma and the one or more of the gamut boundary descriptors and the mapping configurations.

6. The apparatus of claim 1, wherein the one or more processors are further to generate a linear RGB output based on the gamut mapping, wherein the one or more processors comprise one or more of a graphics processor and an application processor, wherein the graphics processor and the application processor are co-located on a common semiconductor package.

7. A method comprising:
  computing one or more of gamut boundary descriptors and mapping configurations associated with a colored image captured using one or more cameras; and
  performing gamut mapping of color representation of the image based on the one or more gamut boundary descriptors and mapping configurations, wherein the gamut mapping to facilitate color reproduction of the image, wherein the gamut mapping is customized based on selection of the one or more gamut boundary descriptors and mapping configurations, and application of the one or more gamut boundary descriptors and the one or more mapping configurations to calculations based on color corrections and color enhancements corresponding to a mapping type, wherein the one or more gamut boundary descriptors and mapping configurations are selected and applied based on their hue dependency as revealed through calculated hue.

8. The method of claim 7, further comprising:
  facilitating a color correction operation on linear red green blue (RGB) data associated with the image, wherein the image is received as a linear RGB input; and
  facilitating a color enhancement operation on the color corrected linear RGB data associated with the image.

9. The method of claim 8, further comprising:
  calculating luma associated with the color enhanced linear RGB data;
  calculating chroma associated with the color enhanced linear RGB data; and
  calculating hue associated with the color enhanced linear RGB data.

10. The method of claim 7, wherein the gamut mapping comprises chroma mapping based on the calculated chroma and the one or more of the gamut boundary descriptors and the mapping configurations.

11. The method of claim 10, wherein the gamut mapping comprises luma mapping based on the calculated luma and the one or more of the gamut boundary descriptors and the mapping configurations.

12. The method of claim 7, further comprising generating a linear RGB output based on the gamut mapping, wherein the method is facilitated by one or more processors comprising one or more of a graphics processor and an application processor, wherein the graphics processor and the application processor are co-located on a common semiconductor package.

13. At least one computer-readable medium comprising instructions which, when executed by a computing device, cause the computing device to perform operations comprising:
  computing one or more of gamut boundary descriptors and mapping configurations associated with a colored image captured using one or more cameras; and
  performing gamut mapping of color representation of the image based on the one or more gamut boundary descriptors and mapping configurations, wherein the gamut mapping to facilitate color reproduction of the image, wherein the gamut mapping is customized based on selection of the one or more gamut boundary descriptors and mapping configurations, and application of the one or more gamut boundary descriptors and the one or more mapping configurations to calculations based on color corrections and color enhancements corresponding to a mapping type, wherein the one or more gamut boundary descriptors and mapping configurations are selected and applied based on their hue dependency as revealed through calculated hue.

14. The computer-readable medium of claim 13, further comprising:
  facilitating a color correction operation on linear red green blue (RGB) data associated with the image, wherein the image is received as a linear RGB input; and
  facilitating a color enhancement operation on the color corrected linear RGB data associated with the image.

15. The computer-readable medium of claim 14, further comprising:
  calculating luma associated with the color enhanced linear RGB data;
  calculating chroma associated with the color enhanced linear RGB data; and
  calculating hue associated with the color enhanced linear RGB data.

16. The computer-readable medium of claim 13, wherein the gamut mapping comprises chroma mapping based on the calculated chroma and the one or more of the gamut boundary descriptors and the mapping configurations.

17. The computer-readable medium of claim 16, wherein the gamut mapping comprises luma mapping based on the calculated luma and the one or more of the gamut boundary descriptors and the mapping configurations.

\* \* \* \* \*